(12) United States Patent
Koch et al.

(10) Patent No.: US 11,112,325 B2
(45) Date of Patent: Sep. 7, 2021

(54) ARRANGEMENT OF A FLUID-CARRYING ELEMENT DIRECTLY OR INDIRECTLY ON A HOUSING OF A COMPRESSOR

(71) Applicant: Volkswagen Aktiengesellschaft, Wolfsburg (DE)

(72) Inventors: Johannes Koch, Braunschweig (DE); Marko Kuenstner, Rennau (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 172 days.

(21) Appl. No.: 16/563,367

(22) Filed: Sep. 6, 2019

(65) Prior Publication Data

US 2020/0080907 A1 Mar. 12, 2020

(30) Foreign Application Priority Data

Sep. 7, 2018 (DE) ...................... 10 2018 215 280.2

(51) Int. Cl.
*G01L 19/00* (2006.01)

(52) U.S. Cl.
CPC ................................ *G01L 19/0007* (2013.01)

(58) Field of Classification Search
None
See application file for complete search history.

(56) References Cited

U.S. PATENT DOCUMENTS

| | | | |
|---|---|---|---|
| 7,204,241 B2 | 4/2007 | Thompson et al. | |
| 10,208,761 B2 | 2/2019 | Weule | |
| 10,527,051 B2 | 1/2020 | Masutani et al. | |

FOREIGN PATENT DOCUMENTS

| | | |
|---|---|---|
| CN | 101048597 A | 10/2007 |
| CN | 201497624 U | 6/2010 |
| CN | 202431613 U | 9/2012 |
| CN | 203337327 U | 12/2013 |
| CN | 207278540 U | 4/2018 |
| DE | 10310182 B4 | 11/2004 |
| DE | 102007017669 A1 | 10/2008 |
| DE | 102010012913 A1 | 9/2011 |
| DE | 102011104424 A1 | 12/2012 |
| DE | 102012223462 B3 | 8/2013 |
| DE | 2014203466 B4 | 8/2015 |
| DE | 102015209704 A1 | 8/2016 |
| DE | 102015209651 A1 | 12/2016 |
| DE | 102016005972 A1 | 2/2017 |
| WO | WO2016166909 A1 | 10/2016 |

OTHER PUBLICATIONS

Chinese Office Action dated Apr. 12, 2021 in corresponding application 201910843156.9.

*Primary Examiner* — Lisa M Caputo
*Assistant Examiner* — Nigel H Plumb
(74) *Attorney, Agent, or Firm* — Muncy, Geissler, Olds & Lowe, P.C.

(57) ABSTRACT

An arrangement of a fluid-carrying element directly or indirectly on a housing of a compressor, wherein the fluid-carrying element is fluidically connected to the compressor, wherein a separate detection line having a detection opening is provided and the fluid-carrying element has at least one seal for closing the detection opening, which closes the detection opening in a desired assembly position, and wherein for detecting the pressure in the detection line, at least one pressure sensor is provided.

10 Claims, 1 Drawing Sheet

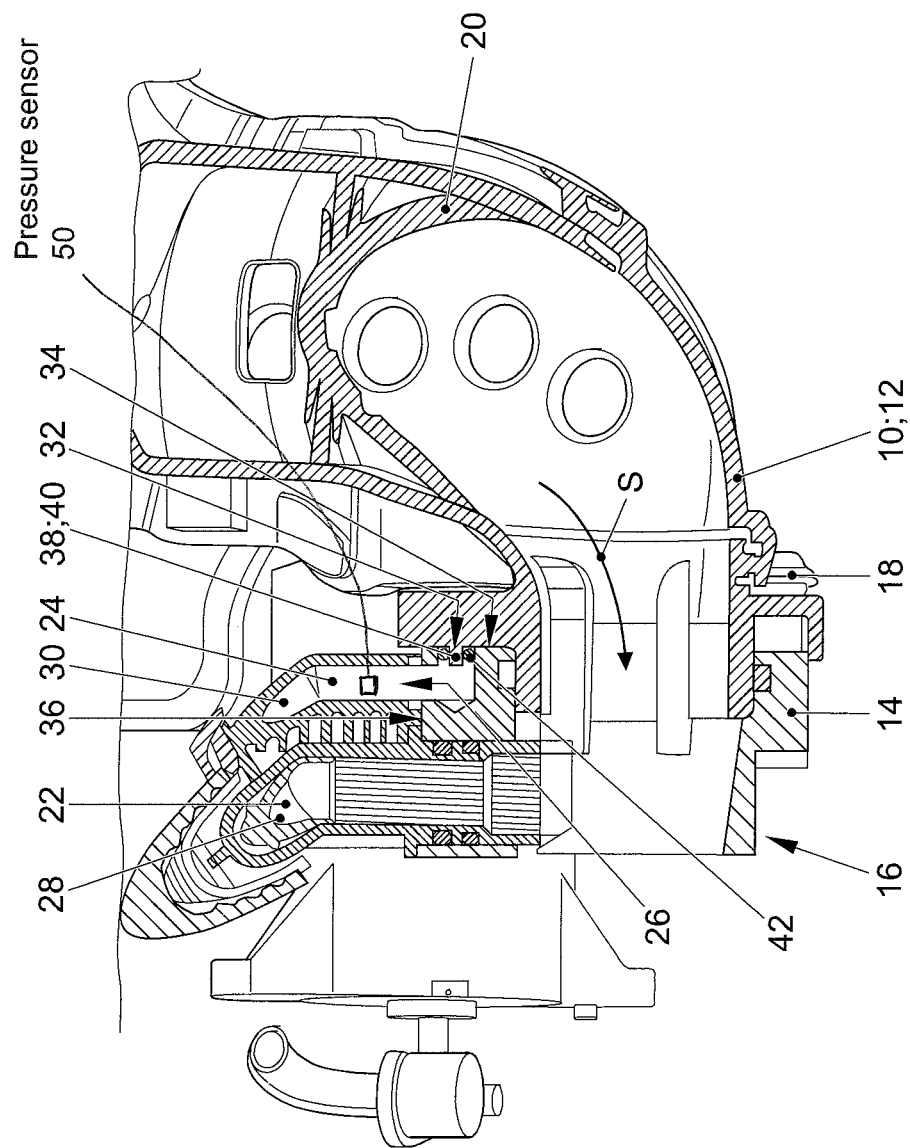

ARRANGEMENT OF A FLUID-CARRYING ELEMENT DIRECTLY OR INDIRECTLY ON A HOUSING OF A COMPRESSOR

This nonprovisional application claims priority under 35 U.S.C. § 119(a) to German Patent Application No. 10 2018 215 280.2, which was filed in Germany on Sep. 7, 2018 and which is herein incorporated by reference.

BACKGROUND OF THE INVENTION

Field of the Invention

The present invention relates to an arrangement of a fluid-carrying element directly or indirectly on a housing of a compressor. In particular, the invention relates to an internal combustion engine having such an arrangement. Furthermore, the invention relates in particular to a motor vehicle having such an arrangement.

Description of the Background Art

From DE 10 2011 104 424 A1, a motor vehicle device having at least one fluidic connection unit is known, wherein the connection unit is provided to releasably connect two fixedly connected line sections to a third line section. The motor vehicle device further comprises a diagnostic unit having a pressure sensor, wherein the pressure sensor is provided to detect the pressure in the two interconnected line sections. The connecting unit has a diagnostic opening which, with incorrect assembly of the connection unit on the third line section, at least opens the line section detected by the pressure sensor to the environment. The diagnostic opening can be closed in particular by a housing of an exhaust gas turbocharger, in which also the third line is formed.

From DE 10 2010 012 913 A1, an on board diagnostic apparatus for a motor vehicle for the recognition of an incorrect assembly of a vent line is known. To this end, the vent line is connected to a separate connection unit, which serves to connect the vent line to an intake line. To the vent line, a diagnostic line is further attached, which is opened in the event of incorrect assembly of the vent line.

SUMMARY OF THE INVENTION

It is therefore an object of the present invention to provide an arrangement of a fluid-carrying element directly or indirectly on a housing of a compressor, by means of which proper assembly of the fluid-carrying element can be checked in a particularly simple manner and utilizing little space.

The invention relates to an arrangement of a fluid-carrying element directly or indirectly on a housing of a compressor, in particular a compressor of an exhaust gas turbocharger. The fluid-carrying element can be an intake hood, which is directly connected to the compressor. Alternatively, the fluid-carrying element is indirectly connected to the compressor via an adapter. The fluid-carrying element is connected to the compressor in a fluidic manner. Furthermore, a separate detection line having a detection opening is provided, and the fluid-carrying element comprises at least one means for closing the detection opening, wherein said at least one means for closing the detection opening closes in a desired assembly position, preferably sealingly. As a means for closing, a "plug-like" element is particularly suitable, preferably having a separate seal, in particular having an O-ring. For detection of the pressure in the detection line, at least one pressure sensor is provided.

In the desired assembly position of the fluid-carrying element on the compressor, the pressure in the detection line corresponds to a known reference pressure. As will be explained below, the reference pressure in particular corresponds to a pressure in a pressure pipe downstream of the compressor, which, depending on the operating phase of the internal combustion engine and in particular as a function thereof, varies depending on whether the internal combustion engine is operated in the suction mode or in the turbo mode. Consequently, the separate detection line is not acted upon by pressure from the fluid-carrying element but is in fluidic connection with a further pressure source, which is independent of the fluid-carrying component. With improper assembly of the fluid-carrying element on the compressor or with a component failure, it may be possible that the then present actual assembly position deviates from the desired assembly position, and the detection opening of the detection line is not closed, in particular not closed sealingly, so that a gas or an increased amount of gas can escape from the detection line through the detection opening. By means of the pressure sensor, the pressure drop associated therewith or a pressure lower than the reference pressure is detected. The detection of such pressure is forwarded in particular to a controller and a corresponding signal is output to the driver and/or a repair shop.

Overall, the inventive arrangement makes it possible to check the connection between the fluid-carrying element and the compressor for a desired assembly position. Accordingly, the connection between the fluid-carrying element and the compressor and/or between the fluid-carrying element and an adapter provided for the indirect connection of the fluid-carrying element to the compressor and the compressor can be checked. The check is particularly simple, and the inventive arrangement requires little space since said arrangement allows for the use of existing checking devices, as will be described below in more detail in connection with the dependent claims.

A review of the desired assembly position is particularly important because exhaust gases or tank gases containing gases can flow in the fluid-carrying element and in the compressor fluidically connected thereto. In the arrangement according to the invention, it can be detected immediately when the connection between the fluid-carrying element and the compressor is no longer functional and the mentioned gases are possibly escaping into the environment (atmosphere).

As mentioned above, the fluid-carrying element is, in particular, an intake hood. But it can also be an element having a Venturi nozzle and/or an element having a valve. The fluid-carrying element can also be an adapter, which connects an intake hood, an element having a Venturi nozzle and/or an element having a valve to the compressor. These aforementioned fluid-carrying elements are often arranged in fluidic connection with the compressor and are flowed through by gases which contain tank gases or exhaust gases. In that regard, an arrangement according to the invention makes it possible to check the desired assembly position of these fluid-carrying elements.

In a practical embodiment, the detection line is fluidically connected to a pressure pipe arranged downstream of the compressor. The reference pressure in the detection line, which serves to check the desired assembly position, thus corresponds to the pressure prevailing in the pressure pipe. In other words, the detection line is acted upon by pressure from the pressure pipe. To that extent, an already existing pressure source independent of the fluid-carrying element is used and there is no need to arrange any additional pumps. In the pressure pipe, a pressure prevails that differs as a function of the operating phase. In a pure suction mode of the internal combustion engine, especially at low load conditions, the pressure in the pressure pipe is lower than in a turbo mode, in which the intake air is compressed by means of the compressor. The respective reference pressure is determined based on the engine map of the controller, i.e., the reference pressure for various operating points in the engine map of the internal combustion engine is stored in the controller, so that a deviation of the pressure from the currently prevailing reference pressure, for example due to an open detection opening, can be recognized.

In a further practical embodiment, a passage opening is provided in the housing of the compressor which is fluidically connected to the detection opening of the detection line. In particular, the detection line opens into the passage opening with one end of the detection line, on which the detection opening is formed. The at least one means for closing closes the passage opening in the desired assembly position. Preferably, the means for closing closes the passage opening in a sealing manner. Thus, the detection opening is indirectly closed via the closed passage opening. The formation of such a passage opening is advantageous in the event in which the detection line is already connected to the housing of the compressor; in that case, the passage opening represents a particularly space-saving solution in which the means for closing closes the detection opening—in this case, indirectly. The passage opening can be formed in the housing of the compressor as a bore in a particularly cost-saving manner.

In particular, a pin-like element can be provided as the at least one means for closing, which engages in the detection opening or the passage opening in the desired assembly position. The pin-like element closes the detection opening or the passage opening accordingly in the manner of a "plug". The pin-like element protrudes in particular in relation to adjacent areas of the fluid-carrying element. For sealing closure of the detection opening or the passage opening, in particular a sealing element, such as an O-ring, is arranged on the pin-like element. In particular, the pin-like element simultaneously serves to position the fluid-carrying element on the housing of the compressor, so that the pin-like element simultaneously fulfills two functions, whereby costs and material can be saved.

In a particularly space-saving embodiment of the inventive arrangement, a double-walled line can be provided, which has a first partial line and a second partial line. One of the two partial lines is the detection line. By using an already existing line, which is assigned a second partial line, the number of components and in particular the required assembly space is reduced.

In particular, the double-walled line can be a crankcase ventilation line and one of the two partial lines is provided for the flow through of blow-by gases. Alternatively, the double-walled line is a tank ventilation line and is one of the two partial lines, which is provided for the flow through of tank gases. Both the crankcase ventilation line and the tank ventilation line are usually lines that are connected to the compressor, and the blow-by gases or tank ventilation gases open into the region of the fluid-carrying element upstream of the compressor. It is already known to form the crankcase ventilation line as well as the tank ventilation line with double walls and to use one of the two partial lines as a detection line for the respective other partial line. Accordingly, an existing structure of a double-walled line is used to additionally check the desired assembly position of the fluid-carrying component of the compressor. In particular, an already existing option for checking the crankcase ventilation line or the tank ventilation line is used to additionally check the correct assembly of the fluid-carrying element directly or indirectly on the compressor. The double-walled line is in particular an inner first line and a second line surrounding the former over a part or the entire circumference, wherein the tank gases are passed through the inner first line. The second line is then preferably shared as a detection line.

The pressure sensor can be arranged downstream of the compressor in the pressure pipe and the detection line is fluidically connected to the pressure pipe. Alternatively, or in addition thereto, the pressure sensor is arranged upstream of the compressor in the intake pipe and the detection line is fluidically connected to the intake pipe. For further cost savings, an already existing pressure sensor is thus used for monitoring the pressure in the detection line. In an actual assembly position, which deviates from a desired assembly position such that the detection opening is no longer closed, gases escape through the detection opening, which leads to a drop in pressure in the pressure pipe and/or in the intake pipe and accordingly, is detected by the pressure sensor arranged there.

The fluid-carrying element can be at least partially made of plastic and can therefore be manufactured particularly cost-effectively in high quantities. The inventive arrangement is particularly advantageous for fluid-carrying elements made of plastic, since particularly components made of plastic tend to go brittle after a longer service life due to their type of material and can then suddenly fail. Such failure can be detected reliably with the arrangement according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE illustrates an arrangement according to the invention in a sectional view.

DETAILED DESCRIPTION

The single FIGURE shows an arrangement according to the invention having a fluid-carrying element 10, which in the present case is an intake hood 12 made of plastic. In the embodiment shown, the intake hood 12 is directly firmly connected to a housing 14 of a compressor 16 of an exhaust gas turbocharger by means of screws 18 (only one screw is visible). The intake hood 12 is fluidically connected to the compressor 16. In the flow direction S, intake air flows from an intake pipe 20 through the intake hood 12 into the compressor 16. In the FIGURE, the intake hood 12 is arranged in a desired assembly position on the housing 14 of the compressor 16.

On the housing 14 of the compressor 16, also either a tank ventilation line or a crankcase ventilation line 22 is arranged, which opens into the compressor 16 downstream of the intake hood 12.

For checking the desired assembly position of the intake hood 12 on the housing 14 of the compressor 16, a detection line 24 having a detection opening 26 is provided. In the present case, the detection opening 26 forms the end of the detection line 24. In addition, the tank ventilation line or crankcase ventilation line 22 is formed as a double-walled line and has a first partial line 28, through which either tank gases flow or blow-by gases flow from the crankcase housing, and a second partial line 30, which is the detection line 24. In the present case, the detection line 24 is fluidically connected to a pressure pipe downstream of the compressor 16. Furthermore, the detection line 24 surrounds the first partial line 28 at least in sections over the entire circumference in a known manner.

The detection line 24 having the detection opening 26 is fluidically connected to a passage opening 32 formed within the housing 14 of the compressor 16. In the embodiment shown, the end of the detection line 24 opens with the detection opening 26 into the passage opening 32. In the present case, the passage opening 32 is formed at an angle and extends from a connection surface 34 pointing to the intake hood 12 to a connection surface 36 pointing to the detection line 24.

The fluid-carrying element 10—in this case, the intake hood 12—has a seal for closing 38 the detection opening 26 in the form of a pin-like element 40 having a sealing element 42 in the form of an O-ring arranged thereon. In the illustrated desired assembly position, the pin-like element 40 engages with its sealing element 42 in the passage opening 32 formed in the housing 14 of the compressor 16, so that the passage opening 32 is sealingly closed, and thus, the detection opening 26 is also indirectly sealingly closed.

In an arrangement of the intake hood 12 deviating from the desired assembly position and an associated detaching of the intake hood 12 from the housing 14 of the compressor 16, the pin-like element 40 moves out of the passage opening 32, so that gas can escape from the pressure pipe over the detection line 24 and through the passage opening 32. By means of a pressure sensor 50 arranged in the pressure pipe, the drop in pressure can be detected and the driver or a repair shop can be provided with the feedback that it is possible that exhaust gases may be escaping into the surrounding environment.

The features of the invention disclosed in the accompanying description, in the drawing and in the claims may be essential both individually and in any combination for the realization of the invention in its various embodiments. The invention may be varied within the scope of the claims and in light of the knowledge of the person skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement of a fluid-carrying element directly or indirectly on a housing of a compressor, wherein the fluid-carrying element is fluidically connected to the compressor, the arrangement comprising:
    a separate detection line having a detection opening;
    at least one seal that closes and seals the detection opening in a proper assembly position of the fluid-carrying element on the housing; and
    at least one pressure sensor to detect a pressure in the detection line, such that depending upon the pressure detected by the at least one pressure sensor, it is determined whether a leak occurs at the at least one seal which indicates that the fluid-carrying component is in an improper assembly position.

2. The arrangement according to claim 1, wherein the fluid-carrying element is an intake hood.

3. The arrangement according to claim 1, wherein the detection line is fluidically connected to a pressure pipe disposed downstream of the compressor.

4. The arrangement according to claim 1, wherein, in the housing of the compressor, a passage opening is provided which is fluidically connected to the detection opening of the detection line, and wherein the at least one seal closes and seals the passage opening in the proper assembly position.

5. The arrangement according to claim 1, wherein a pin-like element is provided as the at least one seal, the pin-like element engages in the detection opening or the passage opening.

6. The arrangement according to claim 1, wherein a double-walled line is provided, which comprises a first partial line and a second partial line, and wherein the second partial line is the detection line.

7. The arrangement according to claim 6, wherein the double-walled line is a crankcase ventilation line and the first partial line is provided for the flow through of blow-by gases.

8. The arrangement according to claim 6, wherein the double-walled line is a tank ventilation line and one of the two partial lines is provided for the flow through of tank gases.

9. The arrangement according to claim 1, wherein the fluid-carrying element is made of plastic.

10. The arrangement according to claim 1, wherein a passage opening is provided in the housing of the compressor, the passage opening being fluidically connected to the detection opening of the detection line,
    wherein the fluid-carrying element has a pin that protrudes therefrom, the pin having an O-ring thereon,
    wherein the pin and the O-ring form the at least one seal, and
    wherein the pin and the O-ring are inserted into and engage the passage opening which closes and seals the passage opening and the detection opening of the detection line in the proper assembly position of the fluid-carrying element on the housing.

* * * * *